United States Patent
Watanabe

[11] Patent Number: 5,947,568
[45] Date of Patent: Sep. 7, 1999

[54] ANTI-SKID CONTROL DEVICE USING ACCELERATION GRADIENT

[75] Inventor: Takashi Watanabe, Nagoya, Japan

[73] Assignee: Denso Corporation, Kariya, Japan

[21] Appl. No.: 08/839,790

[22] Filed: Apr. 18, 1997

[30] Foreign Application Priority Data

Apr. 26, 1996 [JP] Japan .................................. 8-108283
Feb. 10, 1997 [JP] Japan .................................. 9-027020

[51] Int. Cl.$^6$ ........................................ B60T 8/70
[52] U.S. Cl. ........................................ 303/163; 303/184
[58] Field of Search ........................... 303/163, 177–185

[56] References Cited

U.S. PATENT DOCUMENTS

| | | | |
|---|---|---|---|
| 3,804,469 | 4/1974 | Takeuchi et al. | 303/163 |
| 4,430,714 | 2/1984 | Matsuda et al. | 303/150 |
| 4,680,714 | 7/1987 | Kubo | 303/176 |
| 5,109,339 | 4/1992 | Watanabe et al. | 303/184 |
| 5,257,192 | 10/1993 | Masaki . | |
| 5,385,393 | 1/1995 | Tanaka et al. | 303/163 |

FOREIGN PATENT DOCUMENTS

| | | |
|---|---|---|
| 1-136859 | 5/1989 | Japan . |
| 3-159863 | 7/1991 | Japan . |
| 5-039020 | 2/1993 | Japan . |
| 6-064515 | 3/1994 | Japan . |
| 7-172287 | 7/1995 | Japan . |

*Primary Examiner*—Matthew C. Graham
*Attorney, Agent, or Firm*—Pillsbury Madison & Sutro LLP

[57] ABSTRACT

An anti-skid control device for braking a vehicle safely and quickly comprises a wheel speed sensor, a computer and an actuator for controlling brake fluid pressure in a wheel cylinder. The computer calculates, based on the wheel speed detected by the sensor, a wheel slip ratio relative to a road surface, a wheel speed acceleration and a gradient of the wheel speed acceleration, and controls the actuator so that it increases, decreases or holds the brake fluid pressure according to the data calculated. The brake fluid pressure is decreased to avoid locking of the wheel when the slip ratio exceeds a predetermined value, the wheel speed acceleration is below a predetermined value and the gradient of the wheel speed acceleration becomes lower than the predetermined level. In this manner, the brake fluid pressure is not decreased unnecessarily, and a desirable anti-skid control is achieved for braking the vehicle quickly and safely.

17 Claims, 8 Drawing Sheets

FIG. 7

| MODES | | DRIVING OUTPUTS |
|---|---|---|
| DECREASE -MODE | PAT. A | START, INCREASE / HOLD / DECREASE ---- (REPEATED)  TD TH  (ex.) TD = 16ms, TH = 10ms |
| | PAT. B | START, INCREASE / HOLD / DECREASE ---- (REPEATED)  TH TD  (ex.) TH = 20ms, TD = 10ms |
| HOLDING -MODE | | START, HOLD ---- (CONTINUED) |
| PULSE -INCREASE -MODE | | START ... COMPLETED, INCREASE / HOLD / DECREASE, pulses 1, 2, ... N  KH KU  (ex.) KH = 100ms, KU = 3ms, N = 10 times |
| INCREASE -MODE | | START, INCREASE ---- (CONTINUOUS) |

ANTI-SKID CONTROL DEVICE USING ACCELERATION GRADIENT

CROSS-REFERENCE TO RELATED APPLICATION

This application is based upon and claims benefit of priority of Japanese Patent Applications No. Hei-8-108283 filed on Apr. 26, 1996 and No. Hei-9-27020 filed on Feb. 10, 1997, the contents of which are incorporated herein by reference.

BACKGROUND OF THE INVENTION

1. Field of the Invention

The present invention relates to a brake fluid pressure control system for an automotive vehicle, and more particularly to a system or a device for controlling an anti-skid operation of the vehicle to make the vehicle stop quickly and safely at a braking operation.

2. Description of Related Art

An anti-skid control device has hitherto been known in which skidding conditions of wheels of an vehicle are detected and brake fluid pressures in the wheel cylinders are controlled so that the pressures are decreased, increased or maintained according to detected skidding conditions. Usually, a slip ratio of the wheels relative to a road surface is controlled in a range from 10% to 20% so that the vehicle is stopped quickly and safely at a braking operation. In this kind of system, when a rotational speed of a wheel becomes lower than a predetermined level and a deceleration of the wheel is larger than a predetermined value, the brake fluid pressure is decreased by means of an electromagnetic valve controlled by a computer, because it is judged that the wheel tends to be locked under those conditions.

The wheel speed and the deceleration, however, may be affected by a condition of the road surface, particularly by its roughness or a momentary decrease of its friction coefficient. Therefore, the braking pressure in the wheel cylinder may be decreased at an improper time according to inadequate information being sensed. This may result in a larger amount of brake fluid consumption in the wheel cylinders, a noise level increase in a pump for returning the brake fluid to a master cylinder and an increased amount of a kick-back of a brake pedal.

SUMMARY OF THE INVENTION

The present invention has been made in view of the above-mentioned problems. An object of the present invention is to provide an anti-skid control device which performs a desirable anti-skid control operation by optimizing an amount or speed of brake fluid pressure decrease in a wheel cylinder, and more particularly to provide an anti-skid control device which controls the brake fluid pressure according to a wheel slip ratio SW relative to a road surface, a wheel speed acceleration dVW and a gradient ddVW of the wheel speed acceleration.

The skid-control operation according to the present invention is performed based on not only the wheel speed VW and the wheel speed acceleration dVW but also the gradient ddVW of the wheel speed acceleration which is obtained by differentiating dVW. Referring to FIGS. 1A, 1B and 1C, the present invention will be summarized in comparison with a conventional system. In a conventional system, the brake fluid pressure in the wheel cylinder is decreased when the wheel speed VW is lower than a predetermined value KV (FIG. 1A) and the wheel speed acceleration dVW is lower than a predetermined value KG (FIG. 1B). In the present invention, the gradient ddVW is added for performing the anti-skid control operation. When the gradient ddVW of the wheel speed acceleration dVW is higher than a predetermined level KJ (at time P1 in FIG. 1C), the brake fluid pressure is not decreased because in this case the wheel speed acceleration dVW is increasing (judging from the level of ddVW) and the wheel speed VW is expected to recover without releasing the braking force. On the other hand, the gradient ddVW is lower than the predetermined level KJ (at time P2 in FIG. 1C), and the pressure is decreased because in this case the wheel acceleration dVW is decreasing and the wheel tends to be locked if the braking force is not released.

This situation will be explained using an equation of motion with regard to a friction torque from a road surface $T\mu$ and a braking torque TB.

$$dVW=(T\mu-TB)/I, \text{ and}$$

$$ddVW=d(T\mu-TB)/I,$$

where I is an inertia moment of a wheel and $\mu$ is a friction coefficient.

A situation where dVW<0 and ddVW>0 means that the difference between $T\mu$ and TB is becoming smaller though TB is larger than $T\mu$ at this moment. Therefore, in this situation, it is not necessary to decrease the brake fluid pressure in the wheel cylinder. If the brake fluid pressure is kept at a level as it is, dVW will increase and, accordingly, VW is expected to increase. On the other hand, a situation where dVW<0 and ddVW$\leq$0 means that TB is larger than $T\mu$ at this moment and the difference between $T\mu$ and TB is still becoming larger. Therefore, in this situation, if the brake fluid pressure is not released, the wheel speed VW will decrease and the wheel will be locked.

By adding one more piece of information as to the gradient ddVW of the wheel speed acceleration for performing the anti-skid control operation, unnecessary pressure decreases in the wheel cylinder are avoided. This is an important feature of the present invention. Moreover, since an amount of the brake fluid to be released to a reservoir from the wheel cylinder is reduced, a pump for returning the brake fluid from the reservoir to a master cylinder may be eliminated or the capacity of the pump can be made smaller. In addition, an operating noise of the pump is reduced and a kick-back given to a brake pedal during the anti-skid control operation will be also reduced.

The anti-skid control device may be constructed so that the pressure decrease in the wheel cylinder is prohibited when the gradient ddVW is positive and higher than a predetermined level. A speed or degree of the pressure decrease in the wheel cylinder may be varied according to the level of the gradient ddVW, so that the wheel speed can recover more quickly when the wheel tends to be locked and the brake fluid pressure is released more gently when the wheel speed tends to recover. There may be provided a pressure holding period and a pressure decreasing period which appear alternately in the pressure decrease operation. The speed of the pressure decrease may be changed by changing the ratio of the holding period to the decreasing period. The speed of the pressure decrease may be also changed by selecting either one of the periods to start the pressure decrease operation.

Other objects and features of the present invention will become more readily apparent from a better understanding of the preferred embodiment described below with reference to the following drawings.

BRIEF DESCRIPTION OF THE DRAWINGS

FIG. 7 is a table showing outputs for driving solenoids in various operation modes according to the present invention;

DETAILED DESCRIPTION OF THE PREFERRED EMBODIMENT

Figure 1:
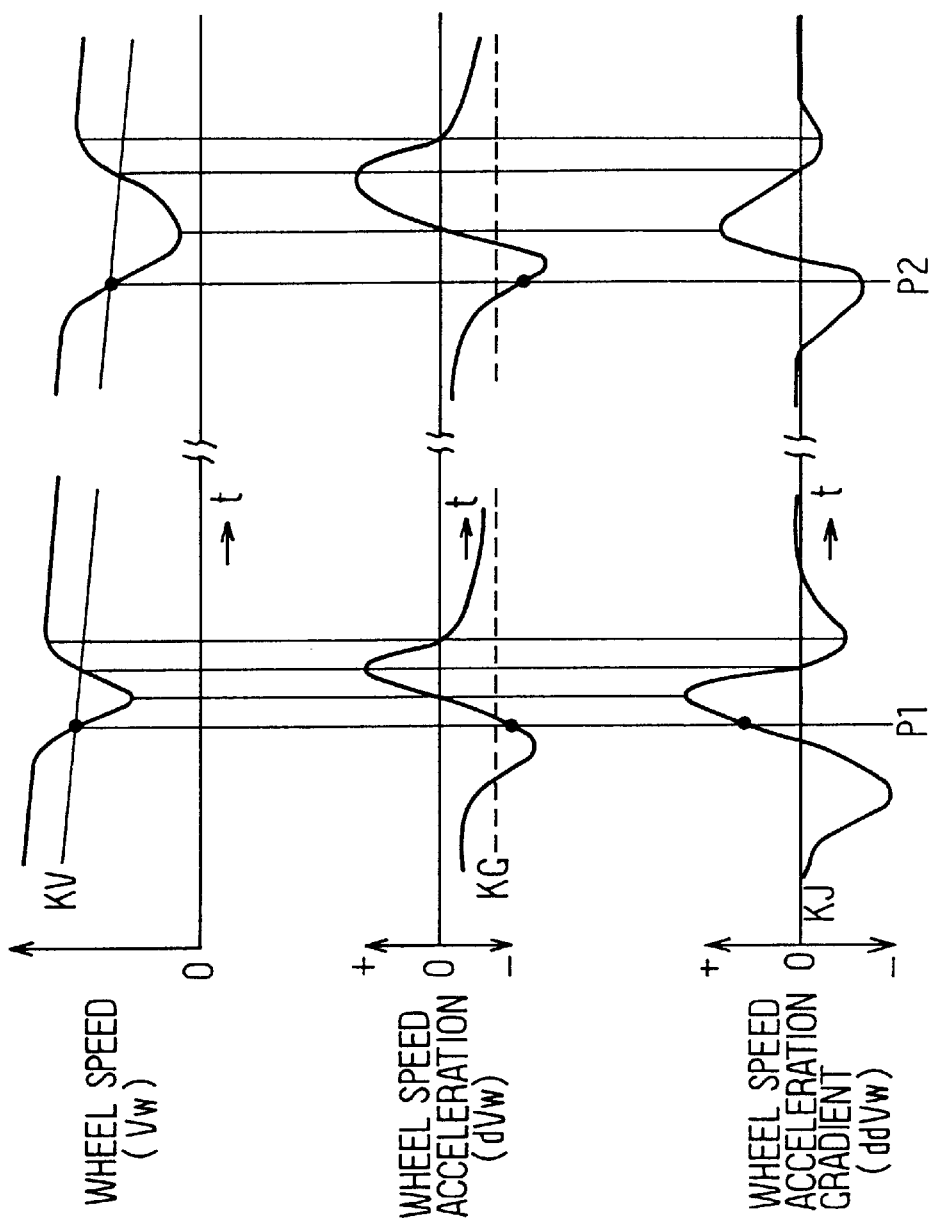
FIGS. 1A, 1B and 1C are graphs respectively showing wheel speed (VW), wheel acceleration (dVW) and acceleration gradient (ddVW) waveforms, during an anti-skid control operation according to the present invention.

An embodiment according to the present invention will be described referring to the drawings. In the present embodiment of an anti-skid control device, brake fluid pressures in wheel cylinders are controlled according to rotational speeds of wheels, acceleration or deceleration of the wheels and gradients of the acceleration or deceleration of the wheels which are calculated by differentiating the acceleration or deceleration. Gradients of the brake fluid pressure decrease are also controlled according to those values.

Figure 2:
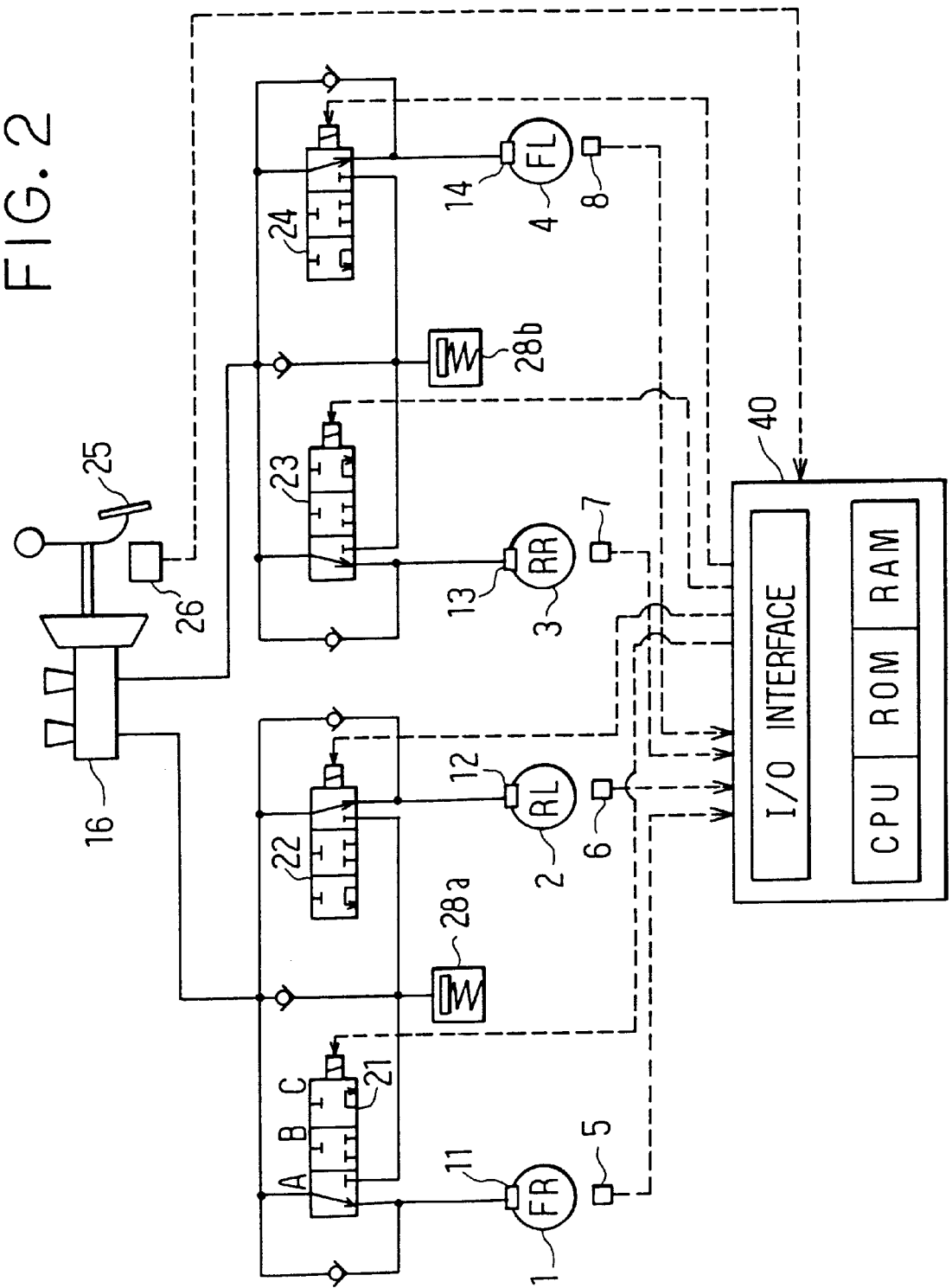
FIG. 2 is a schematic drawing showing a whole construction of an anti-skid control device according to the present invention.

In FIG. 2, a whole structure of the present embodiment is schematically shown, including hydraulic circuits and pressure control valves. The present embodiment is an anti-skid control device applied to a four-wheel automotive vehicle which has a front engine and a front drive system.

Sensors 5, 6, 7 and 8 for detecting rotational speeds of wheels 1 (FR: a front-right wheel), 2 (RL: a rear-left wheel), 3 (RR: a rear-right wheel) and 4 (FL: a front-left wheel), are installed to the respective wheels. Brake devices 11, 12, 13 and 14 for applying braking forces to the respective wheels are installed thereto. The brake devices are operated by brake fluid pressures supplied thereto from a master cylinder 16 through respective actuators 21, 22, 23 and 24. A brake switch 26 is provided which turns on when a brake pedal 25 is depressed and turns off when it is released. The brake fluid is supplied to the wheel cylinders of the front-right and the rear-left wheels from the master cylinder 16 through one conduit, while the brake fluid is supplied to the wheel cylinders of the rear-right and the front-left wheels through another conduit. This is a so called X-arrangement.

Each of the actuators 21, 22, 23 and 24 is a three-position valve operated by an electromagnetic solenoid attached thereto. The actuators are brought to a position A shown as an example in FIG. 2 when the solenoids are not actuated. Brake fluid pressures in wheel cylinders are increased by the brake fluid flowing from the master cylinder 16 through the actuators when those are in the position A. When the solenoids are actuated, the actuators are brought to a position B or a position C according to an mount of electric current flowing in the solenoids. In the position B, the brake fluid flow is cut off and the wheel cylinder pressures are kept at a present level. In the position C, the brake fluid in the wheel cylinders flows into a reservoir 28a or 28b, thereby releasing the wheel cylinder pressures. In other words, the position A is a pressure increase position, the position B is a pressure holding position and the position C is a pressure decrease position.

An electronic controller 40 which is composed of a CPU, ROM, RAM and I/O interface controls the actuators 21, 22, 23 and 24 by selectively bringing them to either one of three positions. The electronic controller 40 is turned to an operative state when an ignition switch of an vehicle is turned on. Signals from the wheel speed sensors 5, 6, 7 and 8, and from the brake switch 26 are fed into the electronic controller 40 which in turn performs various calculation necessary for the anti-skid control operation and controls the positions of the actuators 21, 22, 23 and 24.

Now, operations of the controller 40 will be explained referring to FIGS. 3, 4, 5 and 6, in which operation sequences of the controller are shown.

Figure 3:
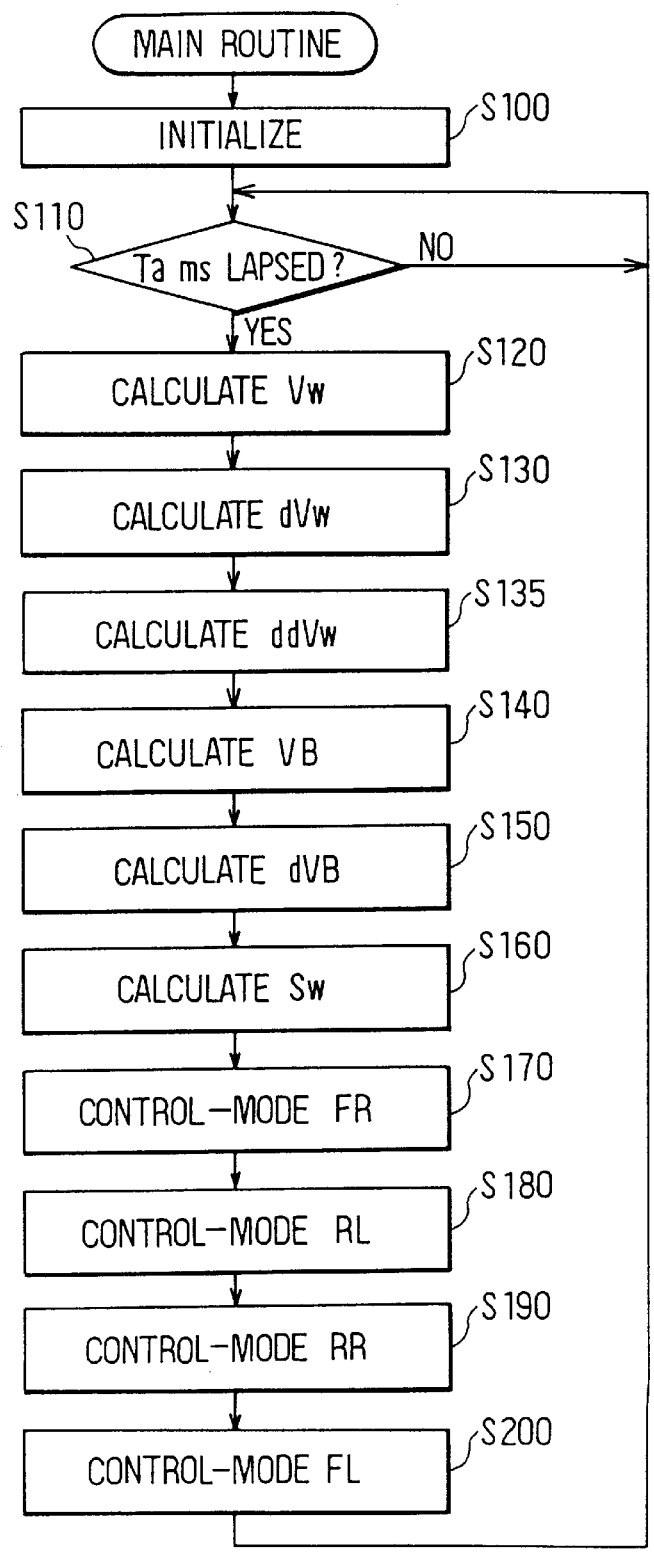
FIG. 3 is a flow chart showing a main routine operation sequence of the control device according to the present invention.

Referring to FIG. 3, at a step 100 (S100) the controller is initialized by clearing memories and setting flags and etc. At S110, whether a predetermined time Ta has lapsed or not is judged to perform calculations with an interval of Ta milliseconds. If the time Ta has not been lapsed, the controller waits until the time Ta lapses. At S120, respective rotational speeds VW of four wheels are calculated according to the signals from wheel speed sensors 5 to 8. At S130, accelerations (or decelerations) dVW of the wheel speeds are calculated by differentiating the wheel speeds VW. Then, at S135, gradients or changing rates ddVW of the accelerations dVW are calculated by differentiating the accelerations dVW. At S140, a vehicle body speed VB are estimated based on the highest wheel speed $VW_{max}$ of four wheel speeds VW calculated at S120. If the highest wheel speed $VW_{max}$ is within a range from ($VB_{n-1}$+K) to ($VB_{n-1}$-K), the vehicle body speed VB is assumed to be $VW_{max}$, where $VB_{n-1}$ is a vehicle body speed calculated at a previous calculation and K is a predetermined value. The value ($VB_{n-1}$+K) is defined as a maximum accelerated body speed and the value ($VB_{n-1}$-K) as a minimum decelerated body speed. If the $VW_{max}$ exceeds the maximum accelerated body speed, the vehicle body speed is presumed as ($VB_{n-1}$+K), and if the $VW_{max}$ is lower than the value ($VB_{n-1}$-K), the vehicle body speed is presumed as ($VB_{n-1}$-K). To estimate the vehicle body speed in the manner above-mentioned has been known hitherto and used in conventional systems, too.

At S150, a vehicle body acceleration dVB is calculated as a differential value of VB estimated at S140. At S160, slip ratios for respective four wheels are calculated according to the wheel speeds VW obtained at S120 and the vehicle body speed VB obtained at S160. The vehicle body acceleration dVB may be directly measured with a G sensor and, in this case, the vehicle body speed VB can be obtained by integrating VB. The slip ratio is defined as SW=(VB−VW)/VB. At S160 to S200, control modes are determined and set for respective wheels according to data, including SW, calculated at the preceding steps. The control modes for controlling the actuators 21 to 24 include a pressure increase mode, a pressure decrease mode, a holding mode and a pulse increase mode.

Figure 4:
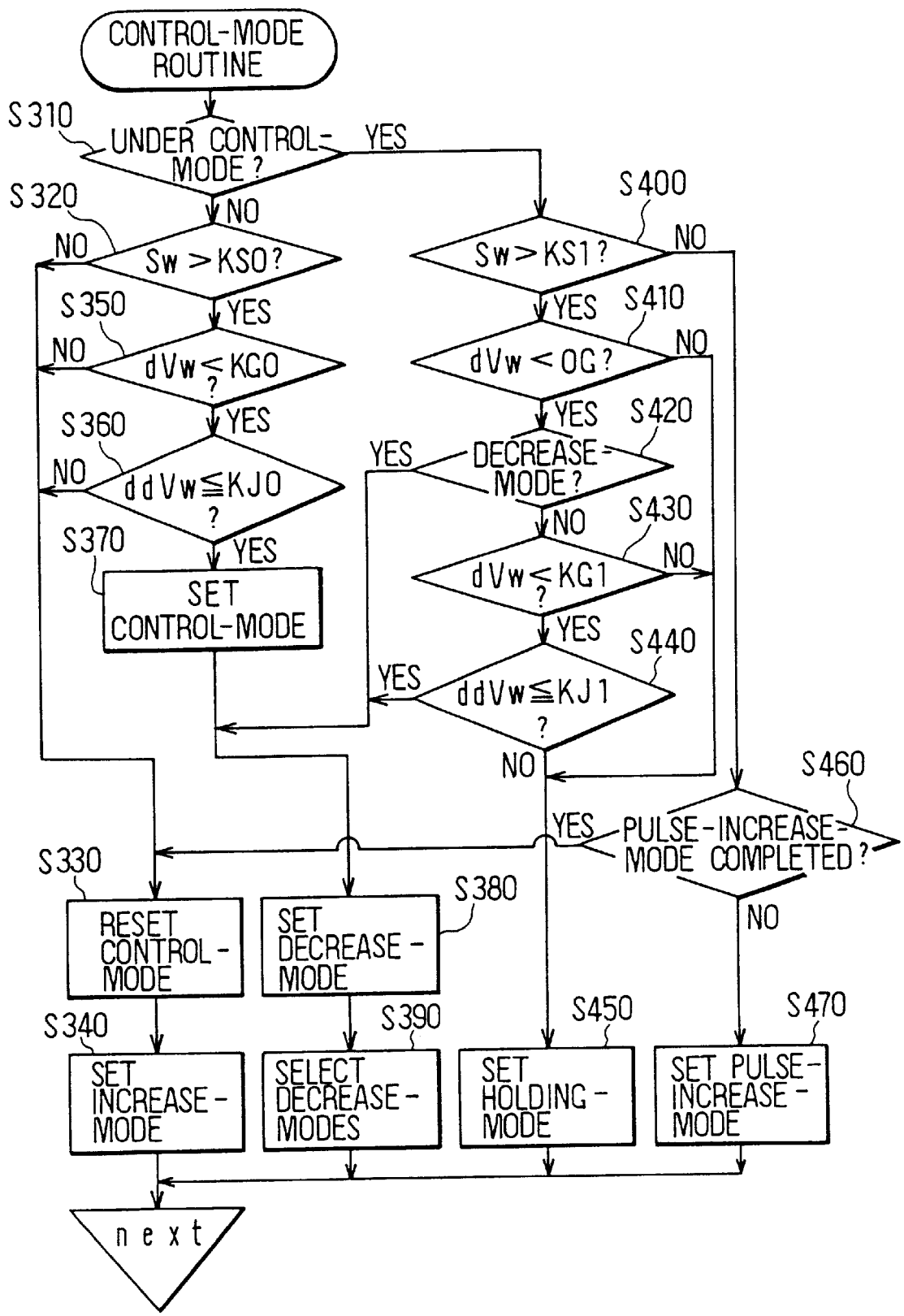
FIG. 4 is a flow chart showing a control mode operation sequence of the control device according to the present invention.

Referring to FIG. 4, a control mode setting routine will be explained. Since the routines corresponding to S170 to S200 are all the same, one routine will be described as a representative of all others. At the first step S310, whether any of the control modes has already been set for a given wheel is judged. If a control mode has not been set, whether or not the slip ratio SW obtained at S160 exceeds a predetermined slip ratio KS0 (for example, KS0=20%) is determined at S320. If it does not exceed the predetermined value, the sequence moves to S330 where the control mode is brought to a reset state, because it is not required to decrease the wheel cylinder pressure. Then, the sequence moves to S340 where the control mode is set at the increase mode in which the actuator takes the position A shown in FIG. 2. The routine sequence ends at this point in this case. On the other hand, if it is judged that the slip ratio SW exceeds the predetermined value KS0 at S320, the sequence moves to S350 where whether or not the wheel speed acceleration dVW is lower than a predetermined value KG0 (for example, KG0=−1.50 G) is checked, because it is necessary in this case to judge a condition of wheel speed more precisely.

If the wheel speed acceleration dVW is below the predetermined value KG0, the sequence moves to S360, and if it is over the predetermined value, the sequence moves to S330. At S360, to judge the condition of the wheel rotation much more precisely, whether or not the gradient of wheel speed acceleration ddVW is below a predetermined level KJ0 (for example KJ0=0 G/sec) is checked. If it is below the predetermined level, the sequence moves to S370, and if it is over the predetermined level, the sequence moves to S330. At S370, the system is brought under control, and at the next step S380, the operation mode is set at the pressure decrease mode in which the actuator takes the positions C and B, shown in FIG. 2, alternately, because in this case the wheel cylinder pressure has been judged in the preceding steps as too high according to the data that the slip ratio SW is larger than 20%, the wheel speed acceleration dVW is lower than −1.5 G, and the gradient of the wheel acceleration ddVW is lower than 0 G/sec. At the next step S390, a degree of the pressure decrease is determined, and the sequence is completed.

Figure 5:
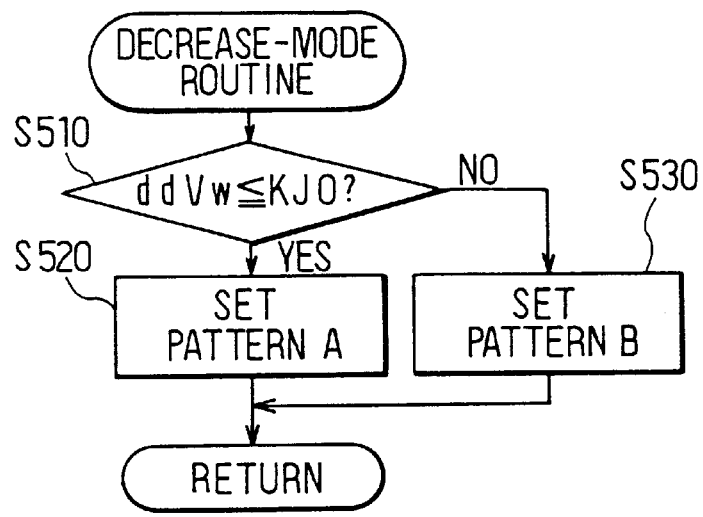
FIG. 5 is a flow chart showing a pressure decrease mode operation sequence of the control device according to the present invention.

Referring to FIG. 5, the pressure decrease mode routine corresponding to S390 in which the degree of the pressure decrease is determined will be explained. In this routine, one of two patterns A and B for decreasing the pressure is selected. As shown in FIG. 7, in the pressure decrease pattern A the pressure is decreased first and then the pressure holding and decrease are alternated, while in the pressure decrease pattern B the pressure is held first and then the decrease and holding are alternated. The degree of the pressure decrease is greater in the pattern A than in the pattern B. In the pressure decrease mode routine shown in FIG. 5, at S510 whether the gradient ddVW of the wheel speed acceleration is below the level KJ0 or not is checked. If it is below the level KJ0, which means that the wheel speed drop is substantial, the pressure decrease pattern A is selected. On the other hand, if it is not below the level KJ0, which means the wheel speed is on the way of recovering, the pressure decrease pattern B is selected. At this point the routine is completed. In the case mentioned before in which the ddVW has been already judged as below the level KJ0 at the step S360, the pressure decrease pattern A is always selected.

Referring to FIG. 4 again, if it is judged that the system is under control at the step S310, the sequence moves to a step S400. At S400, whether the slip ratio SW is larger than a standard value KS1 (for example, KS1=15%) is checked. If it is larger than the value KS1, the sequence moves to S410 and whether the wheel speed acceleration dVW is lower than 0 G is judged. The fact that the wheel acceleration dVW is lower than 0 G means that the wheel speed VW tends to further decrease. If the wheel speed acceleration dVW is higher than 0 G, the sequence moves to S450 and the actuator is brought to the position B which holds the wheel cylinder pressure at a previous value, because in this case it is not necessary to decrease the wheel cylinder pressure. If the wheel speed acceleration dVW is judged at S410 that it is lower than 0 G, the sequence moves to S420 and whether the system has been already set under the pressure decrease mode is checked. If the system has been under the pressure decrease mode, the sequence moves to S390 through S380. At S390, the pressure decrease pattern A or B is selected according to the gradient ddVW of the wheel speed acceleration in the same manner mentioned above. If the system is not under the pressure decrease mode, the sequence moves to S430 where if the wheel speed acceleration dVW is lower than a standard value KG1 (for example, KG1=−1.3 G) is checked, in the same manner as in S350, in order to judge the rotational condition of the wheel more precisely. If the dVW is lower than KG1, the sequence moves to S440. If not, it moves to S450 where the system is brought under the pressure holding mode. At S440, in the same manner as at S360, whether the gradient of the wheel speed acceleration ddVW is lower than a standard value KJ1 (for example, KJ1=0 G/sec), is checked in order to judge the rotational condition of the wheel much more precisely. If the ddVW is lower than KJ1, the sequence moves to S390 through S380. If not, the sequence proceeds to S450. The pressure decrease mode is newly set at S380, and the pressure decrease pattern A is selected at S390 because in this case the gradient ddVW of wheel speed acceleration has been already judged as lower than 0 G/sec at S440.

On the other hand, when it is judged that the slip ratio SW is lower than the standard value KS1 at S400, the sequence moves to S460. At S460, whether the pulse increase mode has been operated for a predetermined period (a predetermined number of times) is checked. The pulse increase mode means that the actuator changes its position from A (the pressure increase position) to B (the pressure holding position), or B to A alternately at a predetermined interval to increase the wheel cylinder pressure gradually according to the alternate interval. If it is judged at S460 that the pulse increase mode is operated for the predetermined period, the sequence moves to S330 where the control mode is reset and then to S340 where the pressure increase mode is set, because in this case it is assumed that the wheel slip is completely suppressed and that it is not necessary to decrease or control the wheel cylinder pressure any more. If it is judged at S460 that the pulse increase mode is not operated for the predetermined period, the sequence moves to S470 where the pulse increase mode is set, and the sequence is completed.

As shown in FIG. 7, the anti-skid control device according to the present invention is operated in four modes: the pressure decrease mode, the pressure holding mode, the pulse increase mode and the pressure increase mode. In other words, the solenoids attached to actuators are driven according to output patterns shown in FIG. 7 in each mode. In the pressure increase mode, no electric power is supplied to the solenoids and the actuators are in the position A which permits brake fluid communication between the master cylinder 16 and brake devices 11 to 14. In the pressure decrease mode, the actuators take the position B or C alternately, so that the brake fluid pressures in the wheel cylinders are released. The pressure decrease mode has two patterns, A and B. In the pattern A, the actuators take the position C (the decrease position) first and then take the position B (the holding position), and thereafter take the position C or B alternately. In the pattern B, the actuators take the position B first and then take the position C, and thereafter take the position B or C alternately. The brake fluid pressure in the wheel cylinders is released more quickly in the pattern A than in the pattern B. In the holding mode, the solenoids are driven with a constant current so that the actuators take the position B which cuts off the brake fluid communication between the master cylinder 16 and the brake devices 11 to 14. In the pulse increase mode, the actuators take the position B first for a period of KH and then take the position A for a period of KU, and thereafter take the position B or A alternately, so that the wheel cylinder pressures are increased gradually.

Figure 6:
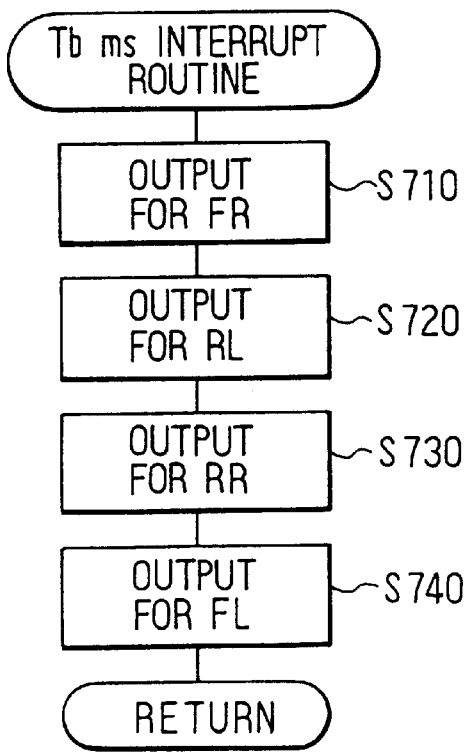
FIG. 6 is a flow chart showing an interruption routine operation sequence of the control device according to the present invention.
Figure 8:
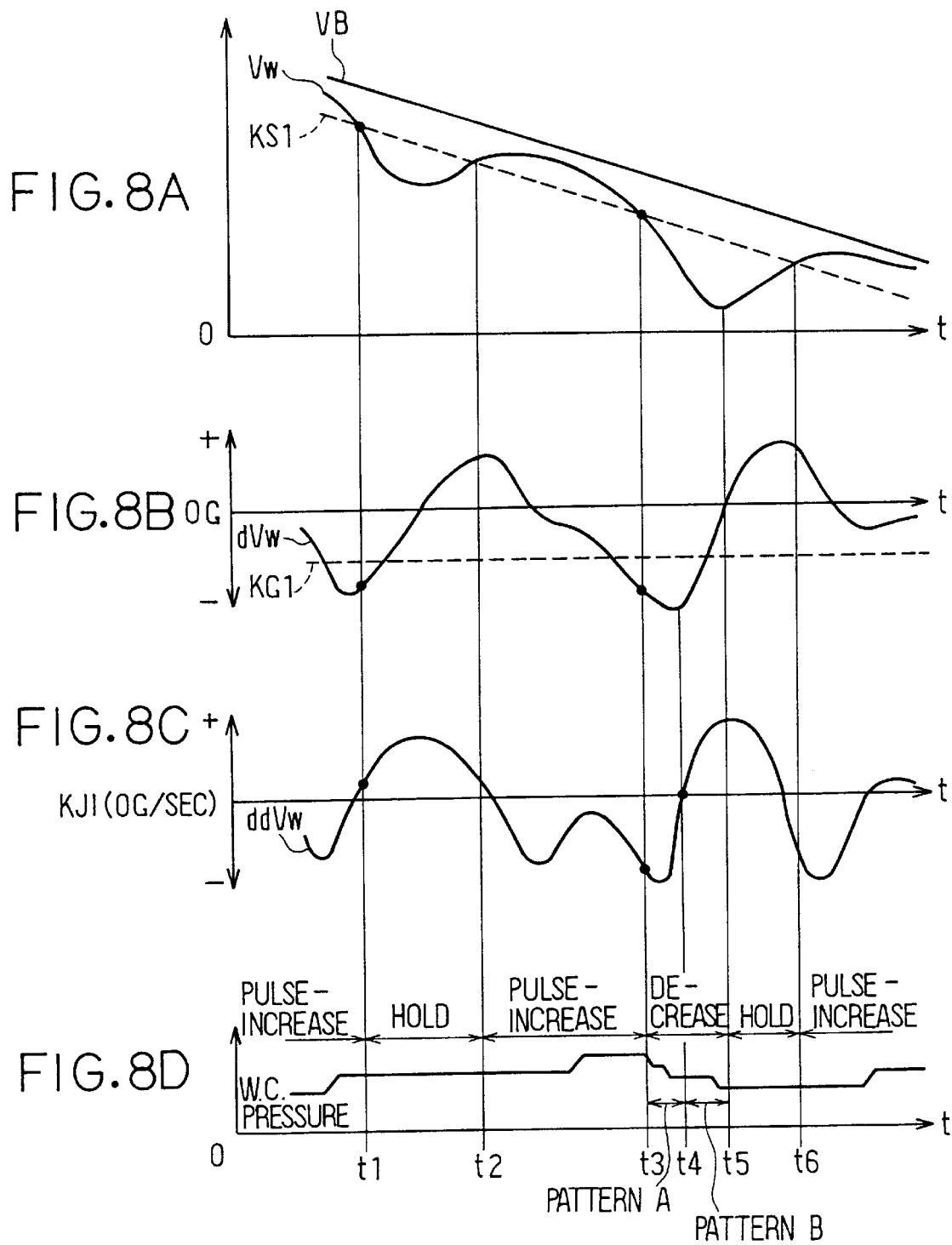
FIGS. 8A, 8B, 8C and 8D are graphs showing an anti-skid control operation of the present invention.

FIG. 6 shows an interruption routine in which the operation is interrupted every predetermined period Tb (for example, 1 millisecond) to drive each solenoid for the respective actuator according to respective modes selected in the main routine shown in FIG. 3. At a step S710, electric outputs for driving the solenoid attached to the actuator 21 according to selected modes are delivered. In the same manner, S720 delivers outputs for the actuator 22, S730 for the actuator 23 and S740 for the actuator 24. Thus, the actuators are brought to one of the positions A, B and C, and the wheel cylinder pressures of the brake devices 11, 12, 13 and 14 are controlled in either one of the four modes, that is, the pressure increase mode, the pressure decrease mode, the holding mode and the pulse increase mode.

An example of anti-skid control operation according to the present invention is shown in FIGS. 8A, 8B, 8C and 8D. Let us assume that, at time t1, for example, the slip ratio SW is larger than a standard value KS1, the wheel speed acceleration dVW is less than a standard value KG1, and the gradient of the wheel speed acceleration ddVW is higher than a standard value KJ1. In this case, the control operation is set in the pressure holding mode and the wheel cylinder pressure is held at a previous level, because the wheel speed acceleration dVW has turned to increase (judging from the value of ddVW) and the wheel speed is expected to recover without decreasing the wheel cylinder pressure. In conventional control systems, the wheel cylinder pressure is decreased even in this particular case, because there is no information as to ddVW. Since it is not necessary to release the brake fluid to the reservoirs 28a and 28b in the case as exemplified above according to the present invention, an amount of the brake fluid to be released to the reservoirs can be reduced. Accordingly, a pump to return the brake fluid to the master cylinder is not needed, and a sufficient time for the anti-skid control is secured without the pump. Moreover, a kick-back given to the brake pedal is reduced because a frequency of the pressure decrease operations is reduced.

Let us assume that, at time t3, for example, the slip ratio SW is larger than a standard value KS1, the wheel speed acceleration dVW is lower than a standard value KG1, and the gradient of the wheel speed acceleration ddVW is less than a standard value. In this case, the control operation is set in the pressure decrease mode and the pressure decrease pattern A is selected, and the wheel cylinder pressure is decreased quickly, because it is judged that the wheel speed acceleration dVW is still decreasing and the wheel speed VW is not expected to recover without decreasing the wheel cylinder pressure quickly. In this manner, the wheel speed VW recovers in a short period of time and, accordingly, the wheel is prevented from being locked and a high braking force can be maintained.

At t4, for example, the slip ratio SW is larger than a standard value KS1, the wheel speed acceleration dVW is lower than a standard value KG1, and the gradient of the wheel speed acceleration ddVW is equal to a standard value KJ1. In this case, the control operation is set in the pressure decrease mode and the pressure decrease pattern B is selected, and the wheel cylinder pressure is decreased gently, because the wheel speed acceleration is going to be increased. In this manner, the wheel speed VW recovers gradually while the amount of the brake fluid to be released is minimized and a high braking force is maintained at the same time.

Figure 9:
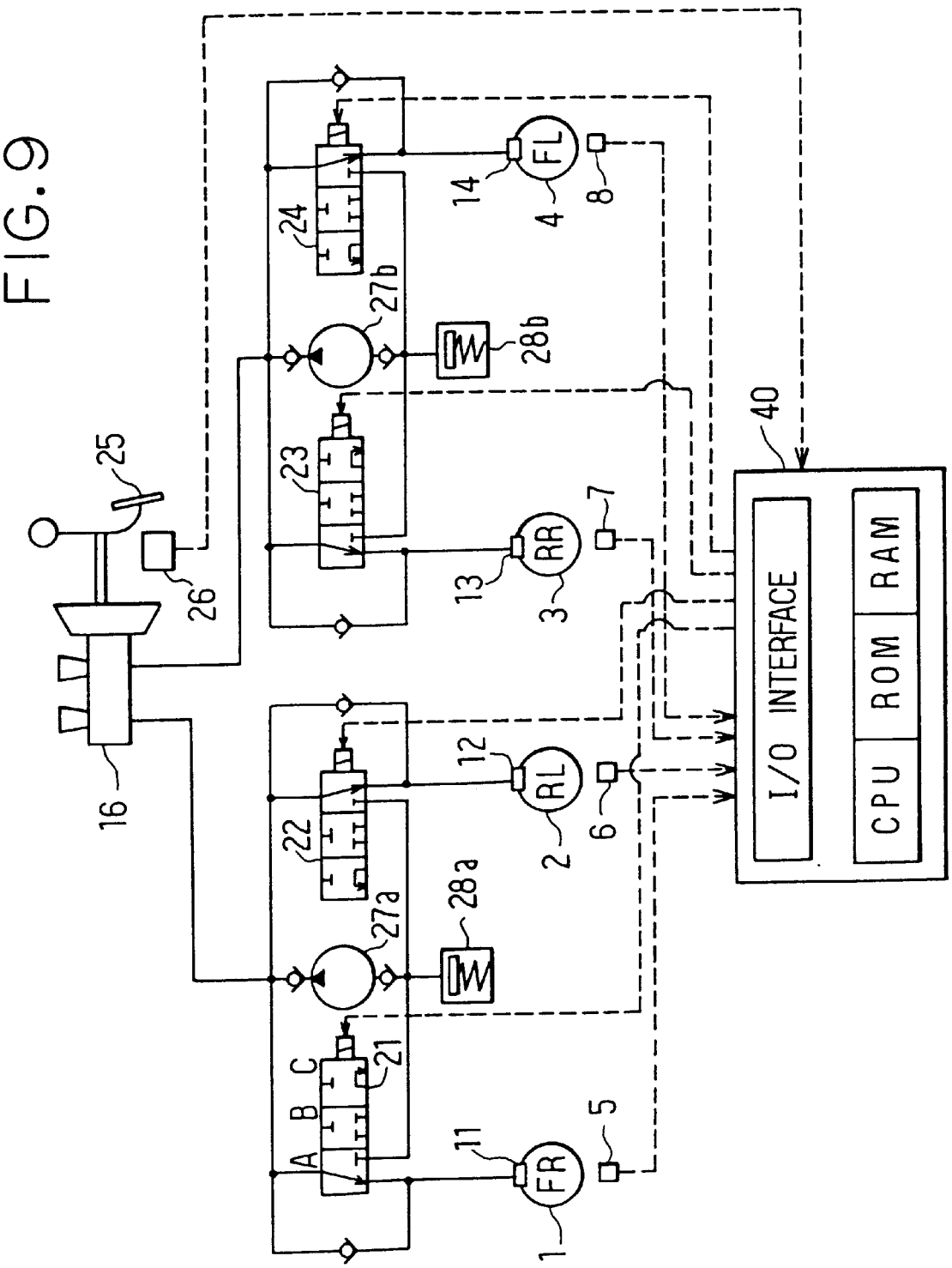
FIG. 9 is a schematic drawing showing a whole construction of a modification of the embodiment according to the present invention.

The embodiment described above according to the present invention may be modified as shown in FIG. 9. In this modification, pumps 27a and 27b for pumping up the brake fluid from the reservoirs 28a and 28b to return the same to the master cylinder 16 are added to the embodiment shown in FIG. 2. The pumps 27a and 27b are connected between the reservoirs and the master cylinder through one-way check valves. Since the amount of the brake fluid released to the reservoir in the device according to the present invention is smaller than that of conventional devices, a pump having a large capacity is not required. The pump having a small capacity can perform its function sufficiently. As another modification, the actuators having three-position valves may be replaced by actuators having two-position valves.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An anti-skid control device for controlling braking of wheels in a moving vehicle having a braking mechanism comprising a wheel cylinder which receives increases in brake fluid pressure to brake a wheel and receives decreases in said brake fluid pressure to relieve braking of said wheel, said anti-skid control device comprising:

means for determining a slip ratio value representing a slip ratio of a wheel relative to a road surface;

means for determining a wheel acceleration value representing an acceleration of said wheel;

means for determining an acceleration gradient value representing a gradient of said wheel acceleration; and controlling means for controlling brake fluid pressure in a wheel cylinder of said moving vehicle according to said slip ratio value, said wheel acceleration value and said acceleration gradient value.

2. The anti-skid control device of claim 1, wherein said controlling means decreases said brake fluid pressure in said wheel cylinder when said slip ratio value exceeds a predetermined value, said wheel acceleration value is below a predetermined value and said acceleration gradient value is below a predetermined value.

3. The anti-skid control device of claim 2, wherein said controlling means decreases said brake fluid pressure in said wheel cylinder by repeatedly alternating between a period of holding said brake fluid pressure and a period of decreasing said brake fluid pressure.

4. The anti-skid control device of claim 2, wherein said acceleration gradient value is determined by calculating a differentiation ddVW of said wheel acceleration value dVW.

5. An anti-skid control device for controlling braking of wheels in a moving vehicle having a braking mechanism comprising a wheel cylinder which receives increases in brake fluid pressure to brake a wheel and receives decreases in said brake fluid pressure to relieve braking of said wheel, said anti-skid control device comprising:

means for determining a slip ratio value representing a slip ratio of a wheel relative to a road surface;

means for determining a wheel acceleration value representing an acceleration of said wheel;

means for determining an acceleration gradient value representing a gradient of said wheel acceleration; and controlling means for controlling brake fluid pressure in a wheel cylinder of said moving vehicle according to said slip ratio value, said wheel speed acceleration value, and said acceleration gradient value, said controlling means decreasing said brake fluid pressure in said wheel cylinder when said slip ratio value exceeds a predetermined value, said wheel acceleration value is below a predetermined value, and said acceleration gradient value is below a predetermined value, said control means varying a rate of the brake fluid pressure decrease according to said acceleration gradient value.

6. An anti-skid control device for controlling braking of wheels in a moving vehicle having a braking mechanism comprising a wheel cylinder which receives increases in brake fluid pressure to brake a wheel and receives decreases in said brake fluid pressure to relieve braking of said wheel, said anti-skid control device comprising:

means for determining a slip ratio value representing a slip ratio of a wheel relative to a road surface;

means for determining a wheel acceleration value representing an acceleration of said wheel;

means for determining an acceleration gradient value representing a gradient of said wheel acceleration; and controlling means for controlling brake fluid pressure in a wheel cylinder of said moving vehicle according to said slip ratio value, said wheel speed acceleration value, and said acceleration gradient value, said controlling means decreasing said brake fluid pressure in said wheel cylinder when said slip ratio value exceeds a predetermined value, said wheel acceleration value is below a predetermined value, and said acceleration gradient value is below a predetermined value, said brake fluid pressure being decreased by repeatedly alternating between a period of holding said brake fluid pressure and a period of decreasing said brake fluid pressure, said control means varying a rate of the brake fluid pressure decrease according to said acceleration gradient value, by changing a ratio of a duration length of said period of holding to a duration length of said period of decreasing.

7. An anti-skid control device for controlling braking of wheels in a moving vehicle having a braking mechanism comprising a wheel cylinder which receives increases in brake fluid pressure to brake a wheel and receives decreases in said brake fluid pressure to relieve braking of said wheel, said anti-skid control device comprising:

means for determining a slip ratio value representing a slip ratio of a wheel relative to a road surface;

means for determining a wheel acceleration value representing an acceleration of said wheel;

means for determining an acceleration gradient value representing a gradient of said wheel acceleration; and controlling means for controlling brake fluid pressure in a wheel cylinder of said moving vehicle according to said slip ratio value, said wheel speed acceleration value, and said acceleration gradient value, said controlling means decreasing said brake fluid pressure in said wheel cylinder when said slip ratio value exceeds a predetermined value, said wheel acceleration value is below a predetermined value, and said acceleration gradient value is below a predetermined value, said brake fluid pressure being decreased by repeatedly alternating between a period of holding said brake fluid pressure and a period of decreasing said brake fluid pressure, said control means varying a rate with which said brake fluid pressure is decreased, according to said acceleration gradient value, by changing a ratio of a duration length of said period of holding to a duration length of said period of decreasing and by selecting one of said period of holding and said period of decreasing as a period to start the pressure decrease.

8. An anti-skid control device for controlling the extent of skidding of wheels in a moving vehicle, each of said wheels being braked by increasing brake fluid pressure in a corresponding wheel cylinder, said control device comprising:

a wheel movement sensor producing a wheel movement signal;

a calculator repeatedly calculating from said wheel movement signal a slip ratio value, a speed value representing a rotational speed of a wheel, an acceleration value representing a rotational acceleration of said wheel, and a gradient value representing a gradient of said rotational acceleration;

a controller controlling brake fluid pressure in a wheel cylinder based upon said speed value, said acceleration value, and said gradient value; and an updating mechanism updating control by said controller of said brake fluid pressure in said wheel cylinder each time the calculated values are calculated.

9. The anti-skid control device of claim 8, further comprising a pressure increaser which increases said brake fluid pressure in said wheel cylinder when said slip ratio value exceeds a predetermined value, said acceleration value is below a predetermined value, and said gradient value is below a predetermined value.

10. The anti-skid control device of claim 9, further comprising a decrease mechanism for repeatedly alternating between a period of sustaining said brake fluid pressure and a period of decreasing said brake fluid pressure.

11. The anti-skid control device of claim 9, further comprising a pressure decrease prohibitor prohibiting a decrease in said brake fluid pressure when said gradient value exceeds a predetermined positive value.

12. The anti-skid control device of claim 9, wherein said controller comprises a pressure decrease varying mechanism for varying a rate of decrease in said brake fluid pressure in accordance with said gradient value.

13. The anti-skid control device of claim 10, wherein said decrease mechanism changes a ratio of a duration length of said period of sustaining to a duration length of said period of decreasing.

14. The anti-skid control device of claim 10, wherein said controller comprises a pressure decrease varying mechanism for varying a rate with which said brake fluid pressure is decreased in accordance with said gradient value by changing a ratio of a duration length of said period of sustaining to a duration length of said period of decreasing and selecting one of said period of sustaining and said period of decreasing as a period to start the pressure decrease.

15. The anti-skid control device of claim 14, further comprising a solenoid comprising a pressure increasing position, a pressure sustaining position, and a pressure decreasing position, said controller comprising an i/o interface, a CPU, a ROM, and a RAM.

16. The anti-skid control device of claim 9, wherein said gradient value is determined by calculating a differentiation ddVW of said rotational acceleration value dVW.

17. An anti-skid control device for controlling braking of wheels in a moving vehicle having a braking mechanism comprising a wheel cylinder which receives increases in brake fluid pressure to brake a wheel and receives decreases in said brake fluid pressure to relieve braking of said wheel, said anti-skid control device comprising:

means for determining a slip ratio value representing a slip ratio of a wheel relative to a road surface;

means for determining a wheel acceleration value representing an acceleration of said wheel;

means for determining an acceleration gradient value representing a gradient of said wheel acceleration; and controlling means for controlling brake fluid pressure in a wheel cylinder of said moving vehicle according to said slip ratio value, said wheel acceleration value, and said acceleration gradient value, said controlling means decreasing said brake fluid pressure in said wheel cylinder when said slip ratio value exceeds a predetermined value, said wheel acceleration value is below a predetermined value, and said acceleration gradient value is below a predetermined value, said control means prohibiting a decrease of said brake fluid pressure in said wheel cylinder when said acceleration gradient value exceeds a predetermined positive value.

* * * * *